Aug. 28, 1934.                F. H. SPEED                1,971,538
              DIE CLEANING DEVICE FOR ELECTRIC WELDING MACHINES
                     Filed March 24, 1932      2 Sheets-Sheet 1
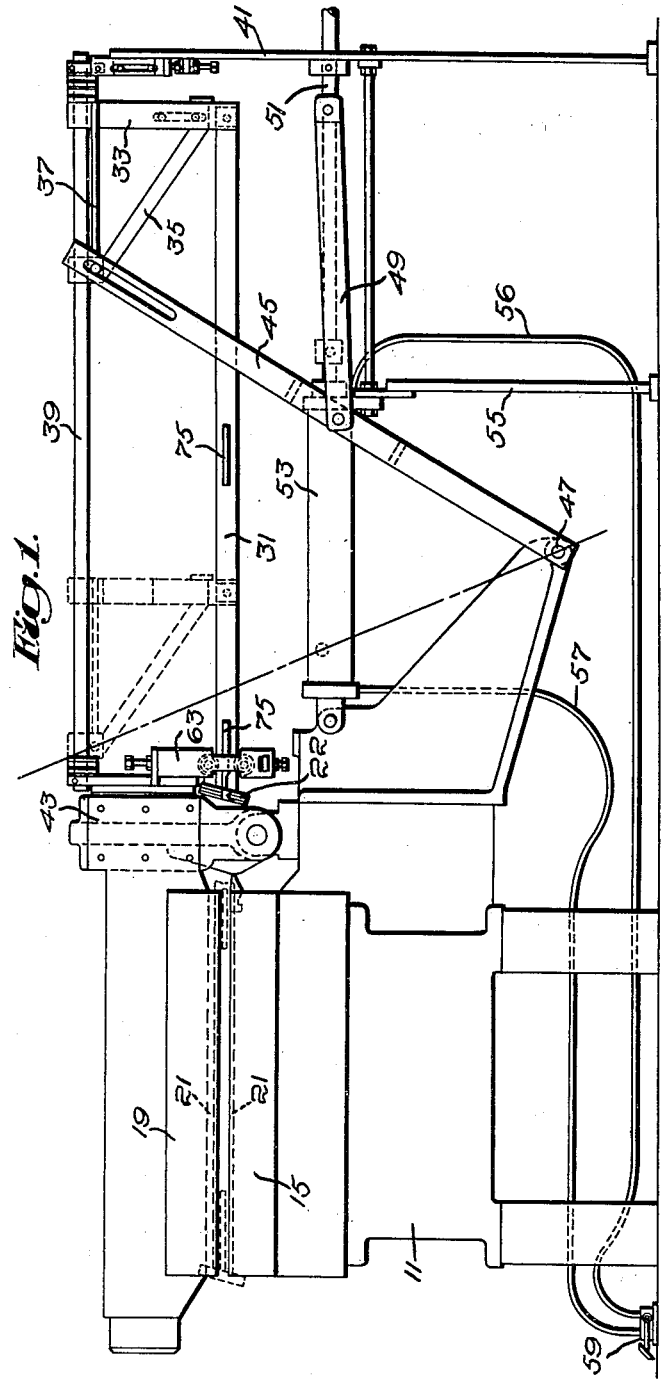
Inventor:
Francis H. Speed, Aug. 28, 1934.  F. H. SPEED  1,971,538
DIE CLEANING DEVICE FOR ELECTRIC WELDING MACHINES
Filed March 24, 1932   2 Sheets-Sheet 2
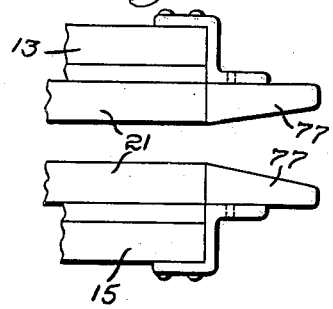
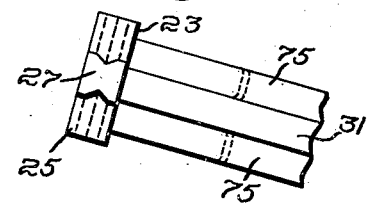
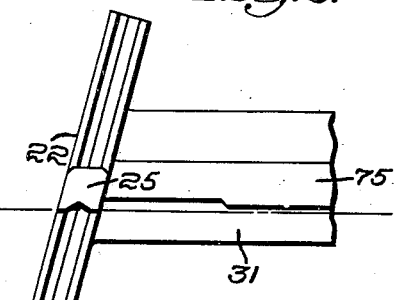
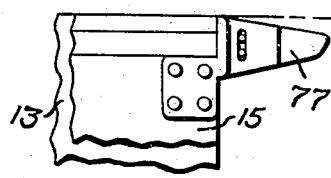
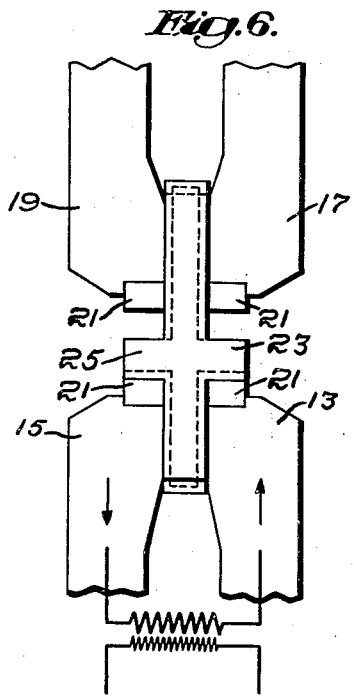
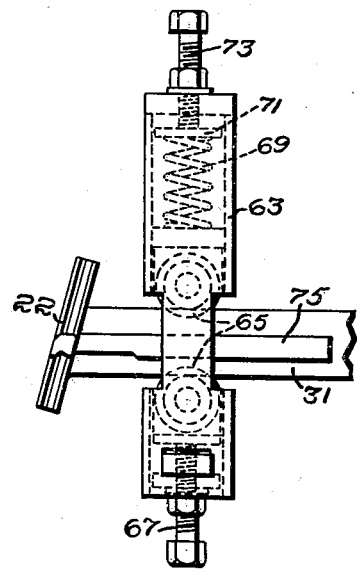
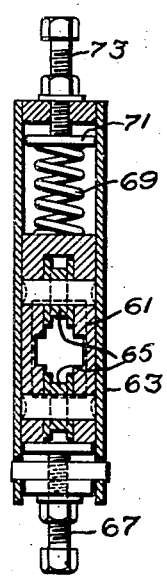
Inventor:
Francis H. Speed,
by Emery Booth Varney Townsend
Attys Patented Aug. 28, 1934

1,971,538

UNITED STATES PATENT OFFICE 1,971,538

DIE CLEANING DEVICE FOR ELECTRIC WELDING MACHINES

Francis H. Speed, Lynn, Mass., assignor to Thomson-Gibb Electric Welding Company, Lynn, Mass., a corporation of Massachusetts Application March 24, 1932, Serial No. 600,904

17 Claims. (Cl. 219—4)

This invention relates to electric welding apparatus and more particularly to apparatus of the butt welding or flash welding type employing welding electrodes or dies, which are maintained in close contacting relation to the clamped work pieces as the latter are forcibly moved toward each other to effect the weld. In the operation of welding, continued use of such apparatus tends to cause the accumulation of flash, scale, dirt and burrs on the die faces which interferes with the heating effect of the welding current, as well as tending to cause a non-uniform heat at different points in the weld.

One of the objects of the present invention is to correct this difficulty by providing means whereby the dies may be frequently, easily and quickly cleaned and cleared of such accumulations, thereby maintaining the welding dies at all times in the most effective condition.

The invention will be best understood by reference to the following description when taken in connection with the accompanying illustration of one specific embodiment thereof, while its scope will be more particularly pointed out in the appended claims.

In the drawings:

Fig. 1 shows the application of one embodiment of the invention to a conventional form of welding machine;

Fig. 2 is a plan view of the centering fingers for the cleaning tool;

Fig. 3 is a side elevation of the centering fingers shown in Fig. 5;

Fig. 4 is a top view of the cleaning tool head, looking at right angles to the plane of its face;

Fig. 5 is a side elevation of the head of the cleaning tool and a portion of its arm;

Fig. 6 shows the position the cleaning tool may be made to assume between the dies in performing the cleaning operation;

Fig. 7 is a side elevation of the tool guiding support; and

Fig. 8 is a cross-sectional elevation taken through the tool and guide support shown in Fig. 7.

Referring to the drawings and to the illustrated embodiment of the invention there disclosed, while it has useful application to welding machines of widely varying types and used for a great variety of purposes, the same is here shown applied to a welding machine 11 designed to weld together the opposing abutting edges of two relatively long sheets of metal, such as the walls of a steel barrel or tank, utilizing combined methods of flash and pressure welding. This welding machine is shown in conventional form only, without elaboration as to the usual well-known constructional details, and is illustrative of a wide variety of die-equipped welding machines to which the invention may be usefully applied.

The machine is provided with lower die members 13 and 15, one of which, for example, the die member 13, may be supported on a fixed platen, and the other of which may be supported on a movable platen, the latter having, as is usual, such a movement as to cause the die members to approach each other when the weld is to be effected. Above the die member 13 is a cooperating die member 17 arranged to be raised and lowered to clamp one of the work pieces between it and the die member 13, and a similar clamping die member 19 is provided above the die member 15 arranged to clamp and hold the opposing work piece, the die member 19 when in clamped position being fixed to and movable with the platen which carries the die member 15 to advance one clamped work piece toward the other. Each die member is provided with a facing 21 comprising a strip or plate of wear resisting metal extending the entire length of the work holding portion of the machine. Mechanisms for imparting the necessary movement of the die members are well known and require no detailed description.

In the machine illustrated, the die faces 21 for the upper die holders 17 and 19 are clamping members only, while the die faces 21 for the lower die holders 13 and 15 constitute not only clamping members but welding electrodes as well, being of conductive metal. The heating current passes from the secondary of the transformer to one of the die holders, as 13, thence through the die face and one of the work pieces to the opposed work piece and die face, and thence through the opposite die holder, as 15, then back to the secondary, as diagrammatically indicated in Fig. 6, this arrangement being quite common in machines of the butt or flash welding type. The invention in its broad aspects, however, has useful application to various other arrangements and relationships of the electrodes and clamps, as, for example, those in which the clamping function is performed in whole or in part by devices other than electrodes and to electrodes and dies of various shapes, forms and sizes.

In the welding operation of a machine of the class shown in the drawings, flash, scale and dirt tends to collect on the die faces, and particularly on the faces of the lower electrode die members 13 and 15, and burrs or other irregularities tend to form on the inside faces of both upper and lower die members, which seriously interfere with the effective welding action of the dies.

To remove such accumulations there is herein provided a mechanically operated clearing device which, when the dies are separated, is adapted to be projected and reciprocated under the control of the operator into the gap between the dies and in engagement with the faces thereof, the clearing member being withdrawn out of operative relation to the machine during intermediate welding operations.

The clearing device (see Figs. 6, 4 and 5) is in the form of a clearing tool, comprising a tool head 22 of a generally cruciform shape having lateral extensions 23 and 25 adapted to enter between the faces of the lower and upper clamping dies 13 and 15 and 17 and 19, respectively, and clear the upper faces of the two lower electrode dies. The tool also has a central portion which is somewhat pitched or inclined backwardly from the bottom to the top and comprises the upper branched portion 27 adapted to enter between the two upper dies 17 and 19, engaging and clearing the inside faces thereof, and the lower portion 29 adapted to enter between the lower dies 13 and 15, engaging and clearing the inside faces of those dies.

The clearing tool may remove the accumulated material by a cutting, scraping, wiping or brushing action over the same, but the four branches of the clearing tool are preferably so formed in cross-section, as represented in Figs. 4 and 5, as to present cutting or scraping edges to the contacting faces of the dies.

To mechanically reciprocate the cutting tool, the latter is carried at one end of an elongated horizontal arm 31 (Fig. 1), the opposite end of which is secured to a depending hanger 33, which, together with the diagonal strut 35 and the tie pieces 37, form a holding frame slidable on the overhead horizontal guide rod 39, the rear end of which is sustained by the upright support 41 resting on the floor and the opposite end on a fixed part 43 of the welding machine.

The sliding frame carrying the clearing tool rod and tool head may be forcibly advanced and retracted by the actuating lever 45, the lower end of which is fulcrumed at 47 on the machine frame and the opposite upper end of which is operatively connected to the holding frame by a pin and slot connection, an intermediate bifurcated part being pivotally connected to the front end of the link 49. The rear end of the link is pivotally connected to the piston rod 51 protruding from the fluid pressure cylinder 53 and connected to a piston therein, one end of the cylinder being supported on the upright support 55 and the opposite end on the frame of the welding machine. The cylinder 53 is provided at opposite ends with pipe connections 56 and 57 passing to a pressure fluid control device, such as the foot-control valve member 59, and thence to a source of fluid pressure (not shown). The foot control is such that pressure is normally applied to the front end of the cylinder and exhausted from the rear thereof to maintain the holding frame and cutting tool retracted, or in the full line position shown in Fig. 1. The foot control lever, however, may be depressed at the will of the operator, thereby admitting pressure fluid to the rear of the cylinder and exhausting it from the front end thereof, this serving to enter the clearing tool between the dies and forcibly pass it throughout the length of the die members, advancing the tool and holding frame to the dotted line position there shown.

To guide and suitably position the tool in its advancing movement toward the machine, the forward end of the tool carrying arm 31 passes through a guiding support (Figs. 7 and 8) secured to the fixed part 43 of the welding machine. The guiding support comprises a guide block 61 apertured to receive the clearing tool arm 31 and mounted for a limited vertical sliding movement in the generally barrel-like casing 63, the latter being cut away to clear the arm. The guide block carries anti-friction rollers 65 which bear against the top and bottom of the arm. The bottom of the block is adapted to abut against an adjustable positioning screw 67 while the top is pressed down by a spring 69, the upper part of which bears against the washer 71, the position of which may be regulated by the adjusting screw 73. The aperture through the guide block is shaped to receive a lateral rib or flange 75 formed on each side of the holding arm, and this may be prolonged on the arm or a number of such ribs may be provided. The guiding support provides a means for adjustably positioning the clearing device so that its clearing edges will approach the gap provided between the welding dies in substantial or approximate alignment with the latter.

The laterally extending ribs 75 on the holding arm are so dimensioned that the upper surfaces are slightly above the upper surfaces of the lateral extensions 23 and 25 of the clearing tool and their under surfaces also slightly above the under surfaces of such extensions. This permits the clearing edges of such extensions to function freely in clearing the upper faces of the lower dies 13 and 15 but interposes between the opposed faces of the dies separating members in the form of the two ribs having a long bearing surface. In the event of an inopportune closing of the clamping dies while the clearing tool is between them, these separating members will limit the closing movement to one of but slight extent and thereby prevent material damage to the die faces, such as might happen were the unrestrained closing pressure to be applied alone to the lateral extensions of the clearing tool.

To further assist in centering the clearing device as it enters between the dies, an entering guide, secured directly to the die holding members, is provided in the form of a pair of opposed centering fingers 77 (Figs. 2 and 3) secured one to each of the lower die holding members 13 and 15. These fingers extend toward the clearing tool guide support from a point flush with the top and inside faces of each die but incline downwardly and outwardly from the gap between the dies to provide an open flared mouth adapted to embrace and receive the lower branched portion 29 of the clearing tool shortly after the latter starts its entering movement, the forward ends of the fingers also underlying the lateral extensions 23 and 25 on the clearing tool head. As the cutting tool approaches the gap, therefore, it is guided by the centering fingers into a position of exact alignment with the gap.

When the clearing tool is to be used for clearing the dies, the latter are positioned as represented in Fig. 6, leaving a gap sufficient to receive with a reasonably snug fit the upper branch 27 of the clearing tool between the two opposed upper dies and the lower branch 29 between the two opposed lower dies. If desired, the upper dies may be brought to a partially closed position against the upper surfaces of the lateral extensions 23 and 25 of the clearing tool, but since it is mainly important to clear the upper surfaces of the lower dies and the inside surfaces of the upper and lower dies, the clamping dies may be left raised or open as represented in Fig. 6.

The tool, however, may be so dimensioned as to enter between and to have clearing or scraping engagement with the inside faces of the dies in either full or open position of the latter or in their closed position (in which, due to the necessary overlap of the work pieces when clamped therein, the dies are still separated by a substantial gap), or in any intermediate position.

As the tool is forcibly advanced between the dies by the action of the pressure cylinder, the lower forward edge of the lateral extensions 23 and 25 tend to bite slightly into the upper faces of each lower die and to effect a cutting or scraping action thereon, and the forward edges of the upper and lower branches exert a cutting or scraping action on the inside faces of the upper and lower dies, thereby effectively removing any accumulations which may have arisen through the preceding welding operation or operations of the machine, after which the tool is returned to its inactive position at the side of the machine, or that represented by full lines in Fig. 1. The tool may be quickly reciprocated the full length of the dies, once or any number of times, following any given welding operation of the machine, and may be used as often as desired between the successive welding operations of the machine.

While I have herein shown and described for the purposes of illustration one specific embodiment of the invention, it is to be understood that extensive deviations may be made from the form, construction and relative arrangement of parts herein shown, or in respect to its application to other types of welding machines, all without departing from the spirit of the invention.

I claim:

1. A welding machine having two pairs of separable clamping dies adapted to have clamped between the members of each pair one of the work pieces to be welded, said pairs of dies being relatively movable toward and away from each other, a member of each pair presenting a welding electrode adapted to be placed in electrical contacting relation to its work piece, a cleaning tool shaped to present cleaning members having cutting edges adapted to enter the gaps between the opposed faces of each pair of dies and presenting other cleaning members having cutting edges adapted to enter the gaps between the opposed faces of each pair, means extraneous to said dies for supporting and guiding said tool during the entire travel of said tool between said dies, and power actuated means for reciprocatively moving said tool to cause it to enter between the dies and move across and in engagement with the surfaces of said dies.

2. A welding machine having a pair of upper and lower spaced welding dies having upper and lower opposed faces adapted to be moved toward each other to clamp between them one of the work pieces to be welded, the lower of said dies presenting an electrode having an upper face adapted to be placed in fixed electrical contacting relation to its work piece, a clearing device shaped to enter the space between said dies in contact with the upper work contacting surface of said electrode when the machine is out of use, and means distinct from and independent of the work pieces to move said device across and in engagement with said surface.

3. A welding machine having oppositely arranged, spaced, welding dies adapted to be applied in clamping relation each to one of the work pieces to be welded, said dies being movable toward each other to effect the weld, a clearing device shaped to enter the space between the dies in contact with the opposed surfaces thereof when the machine is out of use, and means distinct from and independent of the work to move said device across and in engagement with said opposed surfaces.

4. A welding machine having oppositely arranged, spaced electrodes adapted to be applied in fixed electrical contacting relation to opposed work pieces to be welded and presenting opposed electrode surfaces, said electrodes being movable toward each other to effect the weld, a clearing device adapted to enter the space between said electrodes in contact with one of said opposed surfaces when the machine is out of use, and means distinct from and independent of the work for moving said device across and in engagement with said surface.

5. A welding machine having oppositely arranged, spaced, welding dies adapted to be moved each into clamping relation to a work piece to be welded and presenting opposed die surfaces, said dies being movable toward each other to effect the weld, a clearing device adapted to enter the space between said dies in contact with one of said opposed surfaces when the machine is out of use, and means distinct from and independent of the work for moving said device across and in engagement with said surfaces.

6. The combination with a welding machine having a pair of parallel welding electrodes, of a movable clearing device normally positioned at the side of said machine and connected therewith but adapted to be moved into operative relation thereto to engage and clear an electrode surface, means for imparting a reciprocatory movement to said device to move the same in contact with and across an electrode surface and to withdraw the same again out of operative relation to the machine, and means cooperatively relating said device to said machine for guiding the device in a fixed path in its reciprocatory movement.

7. The combination with a welding machine having a welding die, of a movable clearing device adapted to engage and clear a die surface, said device being normally positioned out of operation to the machine but connected in fixed relationship thereto, means for imparting movement to said device into contact with and across a die surface and to withdraw it again from operative relation to the machine, and means cooperatively relating said device to said machine for guiding the device in a fixed path in its surface engaging movement.

8. The combination with a welding machine having pairs of clamping welding dies, of a movable cleaning tool having opposite branches presenting each a cleaning edge and shaped to enter spaces between said dies, said tool presenting between each pair of clamping dies a die separating member having a long bearing surface so related to said cleaning edge as to permit the latter to function in cleaning a die surface while restricting closing movement of the dies when the tool is in operative relation thereto, means for guiding said tool, and means distinct from and independent of the work pieces for moving said tool across and in engagement with the die surface.

9. The combination with a welding machine having clamping dies, of a guided, reciprocatory cleaning tool having a cleaning edge, said tool being movable to pass between and in operative engagement with a die surface, and means presented by said tool rearwardly of said cleaning edge and interposed between said dies in its cleaning movement to limit the closing movement of the dies when the cleaning tool is between the latter.

10. The combination with a welding machine having a welding die, of a movable cleaning tool having a cutting edge adapted to engage with a die surface to clean the same when the machine is out of use, means distinct from and independent of said die for guiding said tool throughout its movement, and means distinct from and independent of the work for forcibly moving said tool into contact with and across said surface.

11. The combination with a welding machine having a plurality of welding dies, of a clearing device having a cleaning surface adapted to enter the space between the dies and engage and clear a die surface when the machine is out of use, power driven means to reciprocate said device into and out of said space, and centering means rearwardly of said cleaning surface to center the clearing device between one pair of dies and another pair of dies in proper relation between the dies.

12. The combination with a welding machine having pairs of parallel welding dies, of a reciprocatory clearing tool shaped to present oppositely arranged clearing members adapted to enter the spaces between opposite pairs of dies, and other oppositely arranged clearing members at right angles thereto adapted to enter and to recede from the spaces between the members of each pair of dies.

13. The combination with a welding machine having a welding die, of a movable cleaning tool provided with a cutting edge adapted to engage a die surface, and power actuated means distinct from and independent of the work to move said tool into and out of engagement with said surface.

14. The combination with a welding machine having a welding die, of a clearing device movable to engage with and clear a surface of said die when the machine is out of use, and power driven means distinct from and independent of the work to move said device into and out of engagement with said die surface.

15. The combination with a welding machine having a welding die, of a movable clearing device adapted to be moved to engage and clear a die surface when the machine is out of use but normally withdrawn from engagement therewith, and mechanical means to impart a reciprocatory movement to said device to engage said die surface.

16. The combination with a welding machine having opposed parallel welding dies, of a movable clearing device adapted to enter between the dies when the machine is out of use, power driven means to move said device between said dies, and an aligning guide extraneous to said dies for guiding the movement of said device with relation to said dies.

17. The combination with a welding machine having clamping dies, of a reciprocatory cleaning tool having a cleaning edge adapted to pass between said dies and in operative engagement with a die surface to clean the same, said tool presenting between said clamping dies a die separating member having a long bearing surface rearwardly of said cleaning edge and so related to said cleaning edge as to permit the latter to function in cleaning the die while restricting the closing movement of the dies when the tool is in operative relation thereto, means rearwardly of said cleaning edge for guiding said tool in its reciprocatory movement, and means independent of the work for reciprocating said tool across and in engagement with the die surface.

FRANCIS H. SPEED.